E. LICHTENSTEIN & C. VITA.
LAUNDRY APPARATUS.
APPLICATION FILED FEB. 7, 1914.
1,111,752.
Patented Sept. 29, 1914.
2 SHEETS—SHEET 1.
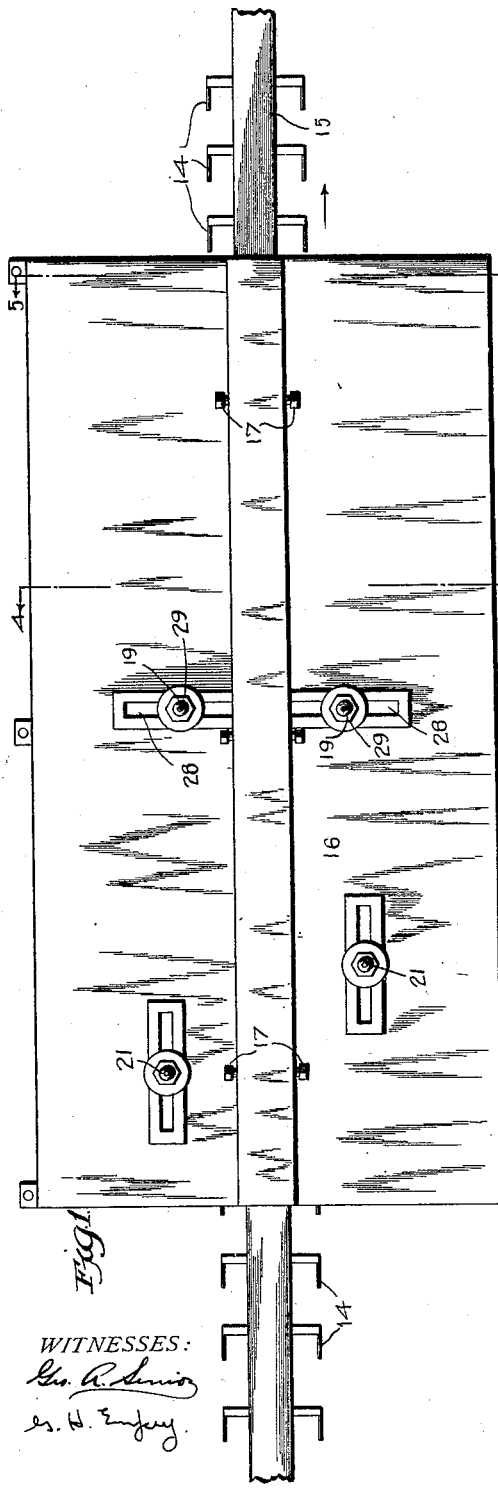
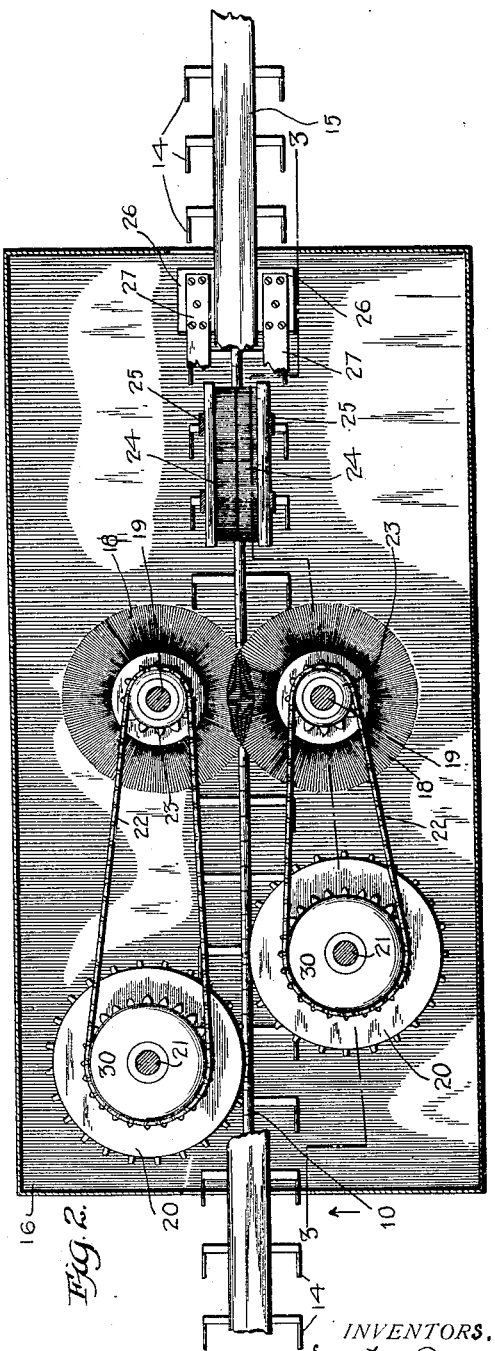
WITNESSES:
INVENTORS.
Edwin Lichtenstein
Charles Vita
BY
Clarence J. Galston
ATTORNEY.

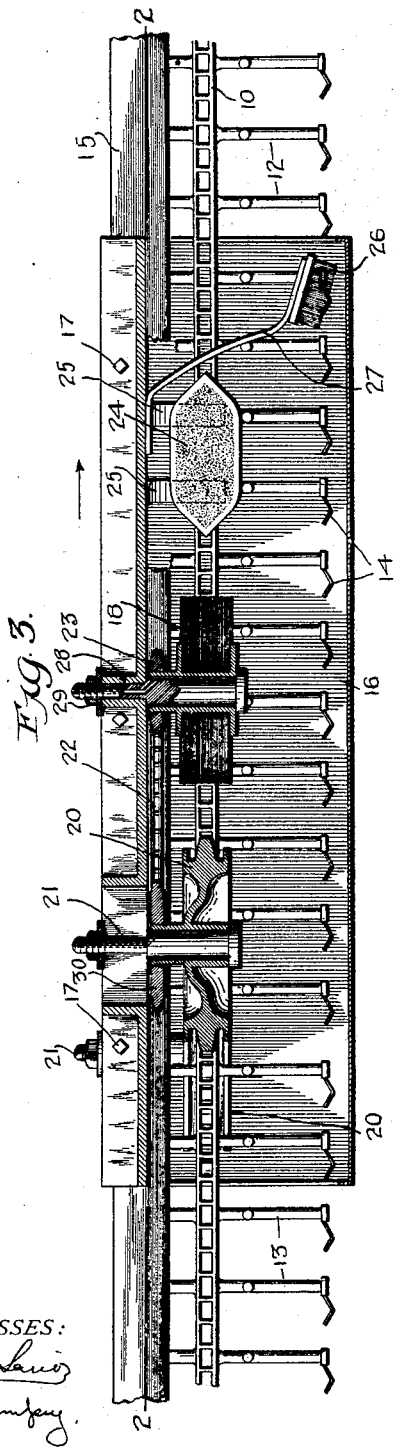
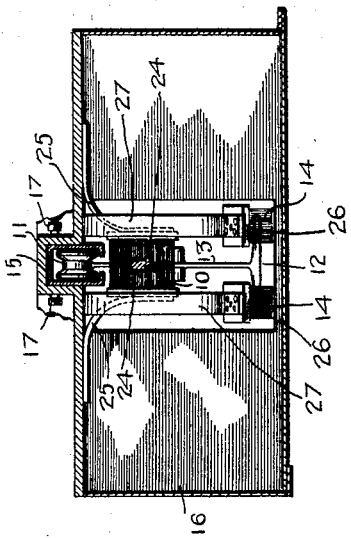
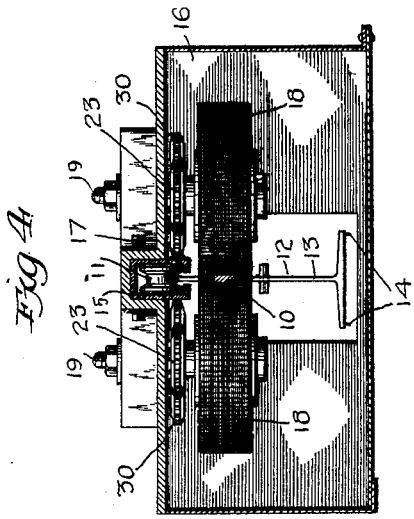

UNITED STATES PATENT OFFICE.

EDWIN LICHTENSTEIN AND CHARLES VITA, OF NEW YORK, N. Y.

LAUNDRY APPARATUS.

1,111,752.   Specification of Letters Patent.   Patented Sept. 29, 1914.

Application filed February 7, 1914. Serial No. 817,162.

*To all whom it may concern:*

Be it known that we, EDWIN LICHTENSTEIN and CHARLES VITA, citizens of the United States, residing in New York city, county and State of New York, have invented a new and useful Improvement in Laundry Apparatus, of which the following is a specification.

This invention relates to laundry apparatus and more particularly to the chains or conveyers for carrying collars through the drying room. These chains acquire a coating of verdigris, particles of which falling upon the collars being transported give rise to objectionable black specks in the laundried articles.

It is the object of the present invention to overcome this condition in a simple and advantageous manner, and to this end there is provided a self contained chain-cleaning mechanism, which is driven by the chain itself. In order to clean the chain in the most effective manner of this coating or other material likely to soil the articles to be laundried, two or more sets of brushes are provided; rotary wire brushes or their equivalents, geared to the chain, being used to loosen the coating, while stationary, relatively-soft bristle brushes, located beyond the rotary brushes, serve to remove the particles still adhering. In order to avoid undue wearing of the chain the rotary wire brushes act upon the chain only at intervals; and for this purpose means are provided whereby these brushes may be moved away from the chain or brought into action, as desired. In addition to the brushes for cleaning the chain proper, still other brushes are also provided for cleaning the collar-receiving hooks, these brushes being preferably yieldingly mounted so as to rise and fall as the hooks ride beneath them. The whole apparatus is inclosed and carried by a casing, which is mounted upon the track of the conveyer.

In the accompanying drawings illustrating the invention: Figure 1 is a plan view of the invention applied to a collar conveyer; Fig. 2 is a horizontal section on the line 2—2 of Fig. 3; Fig. 3 is a vertical section on the line 3—3 of Fig. 2; Fig. 4 is a vertical section on the line 4—4 of Fig. 1; and Fig. 5 is a vertical section on the line 5—5 of Fig. 1.

The invention is shown applied to a known form of collar conveyer, which will serve as a representation of any suitable apparatus of this character. The said conveyer comprises a sprocket chain 10, having upwardly-projecting trolleys 11 and depending collar-receiving hooks 12. The latter may consist of a central stem 13 and laterally-projecting arms bearing rearward-extending pins 14 at the bottom thereof. The trolleys run in an inclosing track 15. The arrow indicates the direction of movement of the chain. The cleaning apparatus is supported and housed by a box or casing 16, which in turn is supported on said track 15, set screws 17 serving conveniently for the purpose. It will be observed that the cleaning apparatus with its casing constitutes a unit which may be readily attached to existing conveyers.

In the particular construction shown there are three sets of brushes inside the casing. The rotary brushes 18, preferably with bristles of wire, are disposed in opposed relation at opposite sides of the sprocket chain, being mounted on vertical shafts 19 fixed to the casing. These brushes are geared to the chain so as to be positively driven thereby, for which purpose sprockets 20 on shafts 21 fixed to the casing are arranged at opposite sides of the chain in mesh therewith and have sprockets 30 compounded therewith, which sprockets 30 are connected by sprocket chains 22 with sprockets 23 united with the rotary brushes.

The next set of brushes 24 serve to brush or rub off the material loosened by the rotary brushes, and are preferably stationary and furnished with relatively soft bristles. As shown, they are brushes of ordinary form with their bristles facing the opposite sides of the chain and their backs secured to brackets 25 fixed to the casing. These brushes are, of course, removable and replaceable when worn.

The third set of brushes 26, which are located beyond the brushes 24, are for the purpose of cleaning the hook pins 14. In the particular construction shown they are mounted on readily yielding spring arms 27 attached to the casing, these arms extending in a general longitudinal direction and the brushes being arranged over the pins with their bristles facing downward. In this way these brushes are caused to rise and fall slightly as the pins pass under them, and a gentle, though effective, brushing of these pins is secured, thus removing bits of adhering starch or particles from the chain which may be dislodged by the other brushes and fall upon these pins.

The operation will be readily understood. The chain in passing between and in contact with the rotary brushes has all its foreign matter effectively removed or loosened, the bristles of these brushes even penetrating into the openings of the chain. The stationary brushes 24 effectively remove all adhering material, and the brushes 26 clean the hook pins. The rotary brushes are not kept in action at all times; and for the purpose of enabling them to be moved out of contact with the chain, and also to permit of adjustment to compensate for wear, their shafts pass through slots 28 in the top of the casing, at any part of which slots the said shafts may be fixed by nuts 29.

What we claim as new is:

1. The combination with a conveyer chain of a laundry drying apparatus, of rotary brushes engaging opposite sides thereof, gearing whereby said brushes are driven by the chain, and stationary brushes positioned to act upon the chain beyond the rotary brushes.

2. The combination with a conveyer chain of a laundry drying apparatus, of rotary wire brushes, gearing whereby said brushes are positively driven by said chain, stationary relatively-soft brushes between which the chain passes after leaving said rotary brushes, and means whereby said rotary brushes may be brought into and out of engagement with the chain.

3. The combination with a collar conveyer comprising a chain and hooks carried thereby, of brush mechanism located to act upon the chain, and other brushes arranged to act upon said hooks.

4. The combination with a collar conveyer comprising a chain and hooks carried thereby, of brush mechanism located to act upon the chain, and yieldingly mounted brushes arranged to act upon said hooks.

5. The combination with a laundry chain carrying hooks, of brush mechanism located to engage the chain, and other brushes mounted yieldingly on arms so as to be capable of rising and falling as said hooks pass beneath them.

6. Mechanism for cleaning a hook-carrying laundry chain, comprising rotary brushes engaging said chain and geared thereto, and other brushes mounted so as to project into the path of said hooks.

7. The combination with a laundry chain carrying hooks, of rotary brushes engaging opposite sides of the chain, gearing connecting said brushes with the chain, stationary brushes located beyond the rotary brushes also to engage opposite sides of the chain, and yielding brushes arranged to be engaged by said hooks.

8. The combination with a laundry chain carrying hooks, of brushes mounted on longitudinal spring arms disposed so that said hooks pass beneath and in contact therewith.

9. The combination with a laundry conveyer comprising a chain having hooks and trolleys and a track for said trolleys, of cleaning mechanism for the chain supported by said track and geared to said chain.

10. In combination with a laundry chain and a track therefor, of a casing mounted on said track, and rotary brushes in said casing geared to and engaging said chain.

11. In combination with a laundry chain having trolleys and hooks, and a track for said trolleys, of a casing mounted on said track, brushes in said casing driven by the chain for cleaning the same, and other brushes in said casing arranged to be engaged by said hooks.

12. The combination with a laundry chain carrying hooks, of cleaning means located to engage the chain, and cleaning means located to engage the hooks thereof.

In witness whereof, we have hereunto set our hands this 27th day of January, 1914.

EDWIN LICHTENSTEIN.
CHARLES VITA.

Witnesses:
PERCY MENDELSON,
F. C. ANDERSON.

Copies of this patent may be obtained for five cents each, by addressing the "Commissioner of Patents, Washington, D. C."